2 Sheets—Sheet 1.

W. T. LEWIS.

COIN CONTROLLED MACHINE.

No. 11,415. Reissued Apr. 17, 1894.

Witnesses:

Jesse B. Heller.

H. L. Mosherville.

Inventor.

William T. Lewis

By [illegible]

Attorney.

2 Sheets—Sheet 2.

W. T. LEWIS.

COIN CONTROLLED MACHINE.

No. 11,415.

Reissued Apr. 17, 1894.

Witnesses:

Jesse B. Heller.

H. K. Mothewell.

Inventor.

William T. Lewis

By

Attorney.

UNITED STATES PATENT OFFICE.

WILLIAM T. LEWIS, OF BAY CITY, MICHIGAN, ASSIGNOR TO SAMUEL WELSH, OF PHILADELPHIA, PENNSYLVANIA.

COIN-CONTROLLED MACHINE.

SPECIFICATION forming part of Reissued Letters Patent No. 11,415, dated April 17, 1894.

Original No. 495,498, dated April 18, 1893. Application for reissue filed September 8, 1893. Serial No. 485,115.

*To all whom it may concern:*

Be it known that I, WILLIAM T. LEWIS, a citizen of the United States, residing at Bay City, in the county of Bay and State of Michigan, formerly of Buffalo, in the county of Erie and State of New York, have invented certain new and useful Improvements in Coin-Controlled Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to that class of devices known as coin controlled machines and it consists in adding to a machine of the above class an automatic apparatus which combines a magazine for holding a number of checks and an orifice and chute attached, through and into which the checks are consecutively discharged from the magazine, the whole being controlled and automatically operated simultaneously with the operation of the coin controlled machine proper.

I will now minutely describe the manner in which I have carried out my invention and then claim what I believe to be novel.

Figure 1:
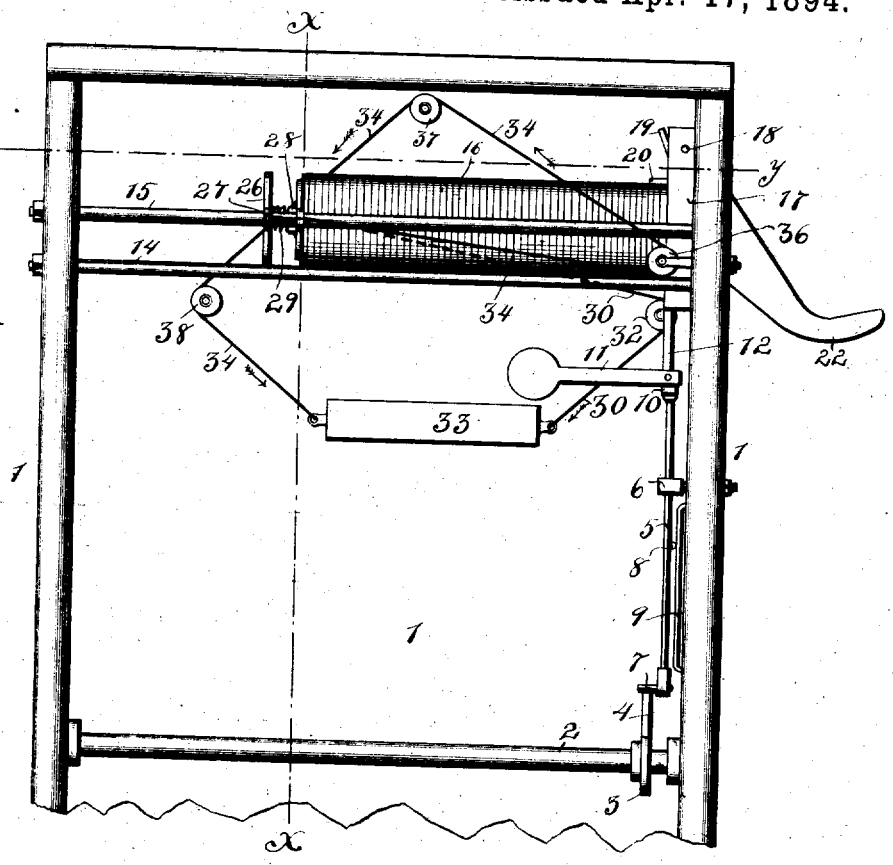
Figure 4:
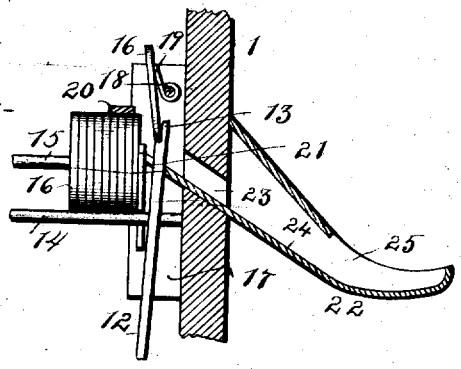
Figure 2:
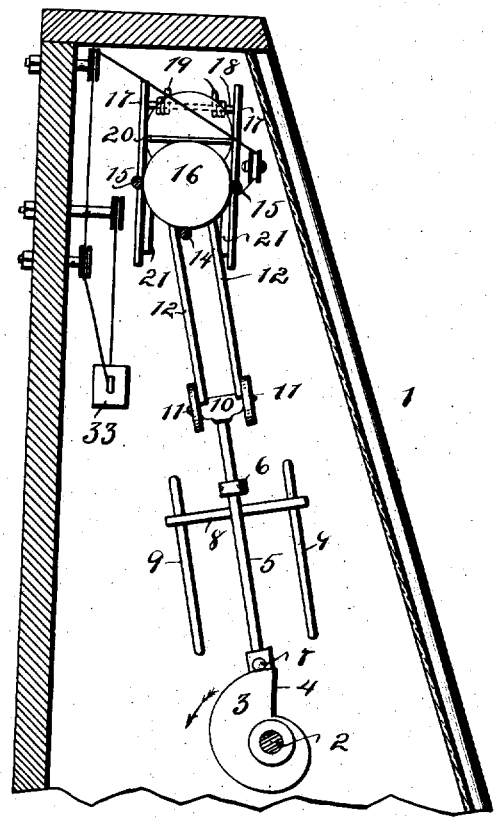
Figure 3:
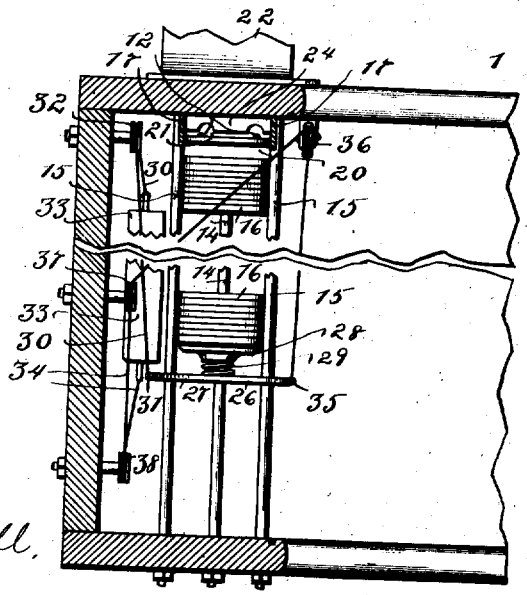

In the drawings: Figure 1 is a front elevation. Fig. 2 is a vertical section taken in line $x-x$ of Fig. 1, and Fig. 3 is a horizontal section taken in line $y-y$ of Fig. 1 of my improved apparatus shown attached to the main shaft of a coin controlled machine, and Fig. 4 is a detached detail view.

Referring to the drawings: 1 is a portion of the casing and 2 the main shaft of a coin controlled machine to which my invention is applied it being only necessary to show this much of the coin machine as the shaft alone operates my improved device which I will now describe in detail.

Upon the shaft 2 is rigidly secured at one side the cam 3 having the shoulder 4. A rod 5 passes loosely through the eye 6 bolted to the side of the case 1. At the lower end of this rod 5 is secured the pin 7 which rests against the cam 3 and is operated thereby. A cross-piece 8 soldered to the rod 5 has a loose bearing against the two projections 9 9 secured to the side of the casing 1 to steady the up and down movement of the rod 5. At the upper end of this rod 5 is rigidly secured the head 10, to which are pivoted the weighted arms 11. To these weighted arms 11 are in turn rigidly secured the two rods 12 12 the upper ends of which are shouldered as at 13. See Fig. 4.

The above device just outlined is for successively releasing the checks from the magazine as will be hereinafter fully described. This magazine for holding the checks is arranged as follows.

14 is a lower rod and 15 15 the side rods which form the trough in which the checks 16 are carried. These extend across the upper part of the casing 1.

17 17 are two side-pieces secured to the inner wall of the casing. Across their upper ends is the rod 18 around which are secured the springs 19 19 and 20 is a cross-piece under which the checks 16 pass as they are fed out of the magazine. The keepers 21 21 serve to hold the checks in the magazine until released.

22 is the chute surrounding the orifice 23, the lower wall 24 of which extends inwardly as clearly shown in Figs. 3 and 4, to receive the released check and carry it to the open end 25 of the chute outside of the casing 1.

26 is a circular plate having side apertures 27 27 which loosely surround the side rods 15 15 of the magazine, and 28 is a follower which presses against the last check in the magazine, a coiled spring 29 being interposed between the follower 28 and plate 26. Pressure is brought to bear against the plate 26 and spring-pressed follower 28 as follows. A cord 30 has one end secured to one side of the plate 26 at the point 31. See Fig. 3. This cord passes round the pulley 32 down to one end of the horizontally suspended weight 33 where it is secured. Another cord 34 is secured to the other side of the plate 26 as at 35 and passing round the pulleys 36 37 and 38 is secured to the other end of the weight 33.

The invention just outlined is intended for use in connection with any coin-controlled machine where checks are to be delivered to the person operating the same and its operation is substantially as follows:

As the shaft is revolved after the coin has been dropped in, for example, a dice-shaking machine, the operating edge of the cam 3 lifts the rod 5 in its eye 6 and with it the two pivoted rods 12 shouldered at 13. At the commencement of the stroke the shoulders 13 rest under the check to be fed into the chute, the position being maintained by the weighted arms 11 11. As the check is raised by the rods 12 12 along the keepers 21 21 its upper end strikes the springs 19 19 thereby throwing its lower end away from the keepers, as it is released therefrom. When the pin 7 on the rod 5 passes off the shoulder 4 upon the cam 3, the rod 5 descends and with it the shouldered rods 12 13. When the check drops upon the floor of the chute and slides down to its open end 25 where it can be removed. The feeding power is obtained by the pressure exerted upon the plate 26 and its follower 28 by means of the weight 33 with its system of cords and pulleys. When the magazine is filled with checks the weight 33 is at its highest point and its pull upon the cords 30 and 34 secured to the plate 26, is practically horizontal. This results in giving to the plate 26 the greatest pull when the magazine holds the most checks and at a time when it is most needed. As the checks are forced out and the weight descends the pressure is decreased correspondingly so that a practically constant pressure is at all times exerted to feed the checks to the point of discharge.

I claim—

1. In an apparatus for automatically and consecutively delivering checks from a coin controlled machine, the combination of a magazine to hold a series of checks, a discharge chute adjacent to the magazine but out of line with the lower support of the magazine, a coin controlled shaft, a discharging piece operated by the shaft adapted to engage the foremost check and remove it from the magazine, and means to remove the check from the discharge piece and direct it to the outlet of the discharge chute, whereby a check is automatically discharged upon the deposit of a coin, substantially as set forth.

2. In an apparatus for automatically and consecutively delivering checks from a coin controlled machine, the combination of a magazine to hold a series of checks, a discharge chute adjacent to the magazine having its outlet above the lower support of the magazine, a coin controlled shaft, and a discharge rod operated by the shaft having a shoulder adapted to engage the foremost check in the magazine and elevate it to the outlet of the discharge chute, whereby the released check is free to pass out of the discharge outlet of the chute when the shouldered rod descends, and means to deflect the raised check and direct it toward the discharge outlet, substantially as set forth.

3. In an apparatus for automatically and consecutively delivering checks from a coin controlled machine, the combination with the magazine 14 15 15, with keepers 21 for holding the checks under pressure, of the releasing device consisting of the rod 5 operated by the cam 3 4 on the main shaft, the rods 12 12 shouldered at 13 and weighted arm or arms pivoted to the rod 5, the springs 19 and chute 22, all operating substantially as shown and described.

4. In a coin-controlled machine, an apparatus for automatically and consecutively delivering checks consisting of the magazine 14 15 15, with keepers 21 and plate 26, the rod 5, operated by the cam 34 on the main shaft the rods 12 12 shouldered at 13 and weighted arm or arms pivoted to the rod 5, the springs 19 and chute 22 and the suspended weight 33 connected to the sides of the plate 26 by the cords 30 and 34, and pulleys 32 36 37 and 38, all combined and operating substantially as shown and described.

5. In an apparatus for automatically and consecutively delivering checks from a coin controlled machine, the combination of a magazine to hold a series of checks, a discharge chute adjacent to the magazine, a keeper adjacent to the end of the magazine to retain the foremost check therein, a coin controlled shaft, a discharging piece operated by the shaft to remove the foremost check in the magazin from behind the keeper, and means to deflect the check when so removed by the discharging piece away from the keeper so that it may pass to the discharge chute substantially as set forth.

In testimony of which invention I hereunto set my hand.

WILLIAM T. LEWIS.

Witnesses:
JOHN LEITH,
OSCAR LE RAUX.